(12) United States Patent
Bender

(10) Patent No.: US 6,858,809 B2
(45) Date of Patent: Feb. 22, 2005

(54) DUMP TRUCK WITH PAYLOAD WEIGHT MEASURING SYSTEM AND METHOD OF USING SAME

(75) Inventor: John L. Bender, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 10/308,855

(22) Filed: Dec. 3, 2002

(65) Prior Publication Data

US 2004/0104596 A1 Jun. 3, 2004

(51) Int. Cl.[7] .............................................. G01G 19/08
(52) U.S. Cl. ...................................................... 177/136
(58) Field of Search ................................. 177/136, 137, 177/138, 139; 701/50; 702/173, 174

(56) References Cited

U.S. PATENT DOCUMENTS

| | | | |
|---|---|---|---|
| 3,857,452 A | * 12/1974 | Hartman | 177/139 |
| 4,635,739 A | 1/1987 | Foley et al. | 177/45 |
| 4,673,047 A | 6/1987 | Harbour | 117/136 |
| 4,839,835 A | 6/1989 | Hagenbuch | 702/174 |
| 5,182,712 A | 1/1993 | Kyrtsos et al. | 702/50 |
| 5,684,254 A | 11/1997 | Nakazaki et al. | 73/774 |
| 5,814,771 A | 9/1998 | Oakes et al. | 177/136 |
| 5,880,408 A | 3/1999 | Schreiner | 177/136 |
| 5,892,181 A | 4/1999 | Takahashi | 177/136 |
| 5,995,888 A | 11/1999 | Hagenbuch | 701/35 |
| 6,703,569 B2 | * 3/2004 | Moore et al. | 177/136 |

FOREIGN PATENT DOCUMENTS

| | | | |
|---|---|---|---|
| EP | 603950 A1 | * 6/1996 | 177/136 |
| JP | 01172711 A | 7/1989 | |

OTHER PUBLICATIONS

"TEREX Unit Rig", product catalog, pp. 1–2, Aug. 23, 2002.*

English Language Abstract of JP 07–273524, Apr. 1997.*

* cited by examiner

*Primary Examiner*—Randy W. Gibson
(74) *Attorney, Agent, or Firm*—Liell & McNeil

(57) ABSTRACT

Accurately measuring the payload weight of dump trucks, especially off highway trucks, is important to efficient operation of most applications, such as in the mining industry. An under-loaded truck decreases efficiency in a known manner. In addition, over-loading a truck can decrease efficiency in the long run by such things as shortening truck component life due to excessive wear, such as on the drive train. The present invention seeks a more accurate payload measurement by positioning the dump body between its travel position and its dumping position. In the payload measuring position, the dump body is supported at four points, which are preferably pins equipped with shear strain gauges. After measuring the payload weight, the dump body is returned to its travel position for transport.

19 Claims, 3 Drawing Sheets

DUMP TRUCK WITH PAYLOAD WEIGHT MEASURING SYSTEM AND METHOD OF USING SAME

TECHNICAL FIELD

The present invention relates generally to measuring the payload weight in a dump truck, and more particularly to measuring a dump truck payload weight when the dump body is between its travel position and its dumping position.

BACKGROUND

Many existing off highway truck payload measurement systems calculate payload weight by measuring the truck's four suspension strut pressures, and use a combination of formulas and empirical data to calculate the payload weight. For instance, co-owned U.S. Pat. No. 5,182,712 to Kyrtsos et al. teaches a dynamic payload monitor with the capability of measuring the compression condition of the truck's four struts while the truck is in motion, in order to produce an even more accurate measurement than that likely possible when the truck is in a stationary position. These strut pressure strategies can typically produce payload weight accuracies on the order of plus or minus 3–5%. While strut pressures provide a fairly good representation of the truck's weight, other factors such as strut seal friction and strut rod bending can reduce the accuracy of the payload measurement system. In addition, the suspension struts support most of the weight of the truck, and therefore, the sensors must be sized large enough to measure the truck weight plus the payload weight. The required large measuring range of the sensors can also tend to reduce the accuracy of the system. Thus, there remains room for improving the accuracy of measuring the payload weight of a dump truck.

The present invention is directed to one or more of the problems set forth above, and to improving accuracy in dump truck payload weight measurements.

SUMMARY OF THE INVENTION

In one aspect, a dump truck includes a dump body pivotally mounted on a chassis. The dump body is moveable to a payload weight measuring position that is between a travel position and a dumping position. At least one payload weight sensor is operably positioned between the chassis and the dump body when in the payload weight measuring position.

In another aspect, a bed support apparatus for a dump truck includes a rocker pad moveably attached to a base. The rocker pad is moveable between a first position in which a travel contact surface is exposed to contact with a dump body, and a second position in which a payload measuring contact surface is exposed to contact with a dump body. A payload weight sensor is operably positioned between the payload weight contact surface and the base.

In still another aspect, a method of operating a dump truck includes a step of moving a dump body to a payload weight measuring position that is between a travel position and a dump position. After measuring the payload weight, the dump body is moved to a travel position.

DETAILED DESCRIPTION

Figure 1:
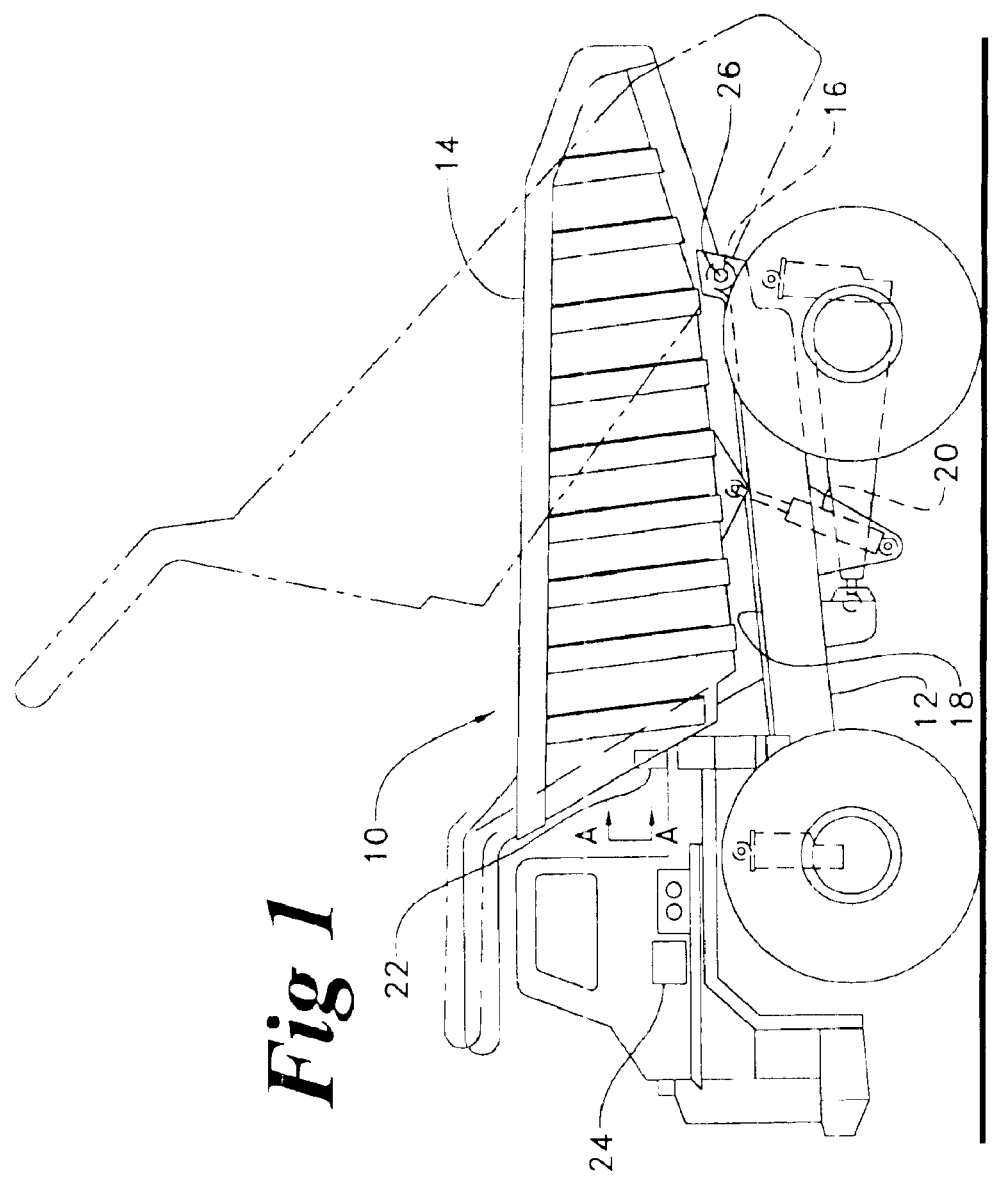
FIG. 1 is a side schematic illustration of a dump truck according to one aspect of the present invention.

Referring now to FIG. 1, a dump truck 10 includes a dump body 14 pivotably attached to a chassis 12. Although dump truck 10 is illustrated as an off highway truck, those skilled in the art will appreciate that the present invention is applicable to virtually all dump trucks. Dump body 14 pivots about a pair of pivot pins 16 when moving from its travel position, as shown, toward its dump position as shown in shadow. This movement of dump body 14 is controlled by at least one dumping actuator 20 in a conventional manner. Each of the pivot pins 16 include at least one payload weight sensor 26, which is preferably a strain gauge appropriately positioned within the pivot pin. Nevertheless, those skilled in the art will appreciate that other types of weight sensors could be substituted, such as a load cell, without departing from the present invention. When dump body 14 is in its travel position as shown in FIG. 1, the weight of dump body 14, and hence its contents, are supported primarily by the pair of payload rail support pads 18, and to a lesser extent by a pair of bed support rocker apparatuses 22 and a pair of dump pivot pins 16 in a conventional manner. The bed support rocker apparatuses 22 serve to help maintain proper centering of dump body 14, such as to avoid side or twisting forces between dump body 14 and chassis 12. Preferably, all of the payload weight sensors communicate their information to an electronic control module 24 in a conventional manner. Using techniques known in the art, such as formulas and empirical data, the electronic control module 24 calculates a payload weight based upon the information provided by the payload weight sensors.

Figure 2:
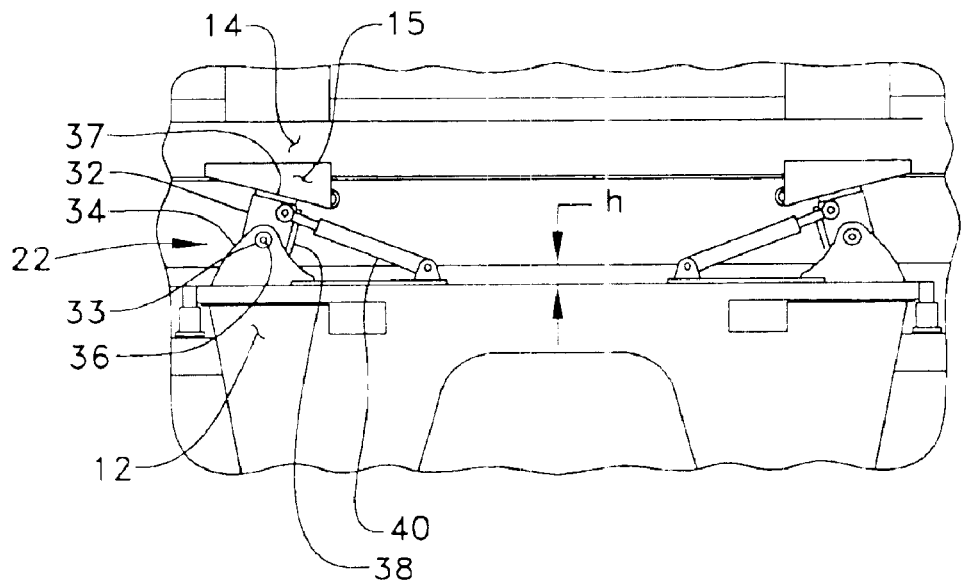
FIG. 2 is a front view of a pair of rocker pad apparatuses for the truck of FIG. 1 as viewed along line A—A, when the dump body is in its payload weight measuring position.
Figure 3:
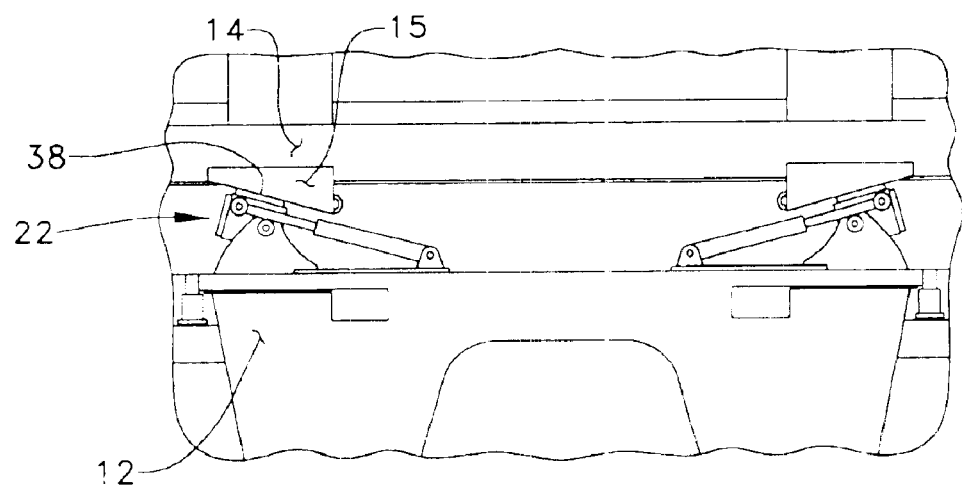
FIG. 3 is a view similar to FIG. 2, except showing the dump body in its travel position.

Referring now to FIGS. 2 and 3, the bed support rocker apparatuses 22 are shown with the dump body 14 in its payload weight measuring position and travel position, respectively. Each rocker pad apparatus 22 includes a rocker pad 32 rotatably mounted on a base 34 via a pivot pin 33. Base 34 is attached to chassis 12 in a conventional manner, such as by welding. Dump body 14 is shown with its centering pads 15 resting on rocker pads 32. A hydraulic cylinder 40, or other suitable actuator, is attached to each rocker pad 32 in order to provide the means by which it can be rotated between the positions shown in FIGS. 2 and 3. When rocker pads 32 are rotated to the position shown in FIG. 2, dump body 14 is supported on payload weight measuring contact surface 37, and the dump body is at a slightly lifted position corresponding to a lift height h so that the entire dump body 14 is supported at four points. The payload weight measuring position is preferably 1.5–2 degrees away from the travel position. These four points include the two dump pivot pins 16 (FIG. 1) and the rocker pad pivot pins 33. Like the dump pivot pins 16, rocker pad pivot pins 33 preferably have a hollow interior that includes a payload weight sensor 36, preferably in the form of a strain gauge that communicates information to the electronic control module 24 of FIG. 1. Thus, when the dump body 14 is in the position shown in FIG. 2, all of the payload weight sensors 26, 36 are operably positioned between dump body 14 and chassis 12. FIG. 3 shows the dump body 14 in its travel position such that dump body centering pads 15 are in contact with travel contact surface 38 of rocker pads 32. In the preferred embodiment, payload weight measuring contact surface 37 and travel contact surface 38 are orthogonal to one another. Nevertheless, those skilled in the art will appreciate that any suitable angular configuration could be substituted without departing from the present invention.

Figure 4:
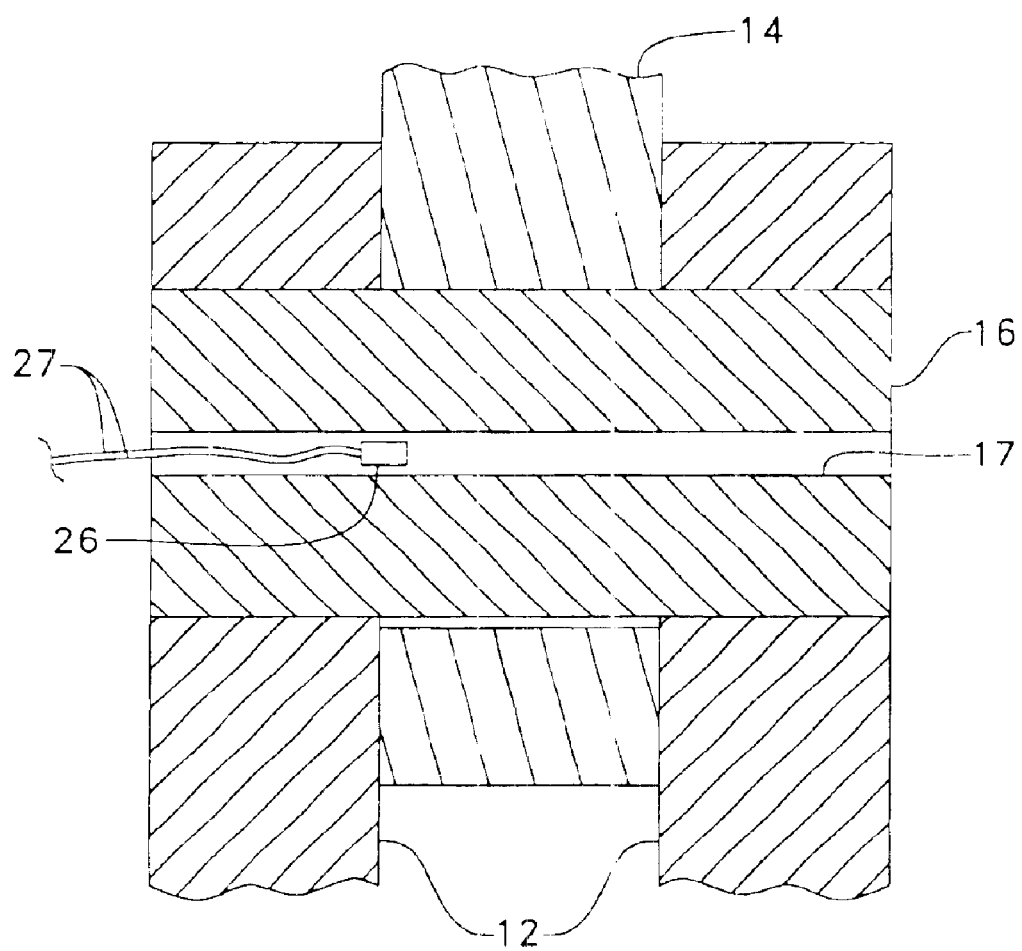
FIG. 4 is a sectioned side view of a pin and payload weight sensor according to another aspect of the present invention.

Referring now to FIG. 4, the internal structure of a dump pivot pin 16 according to a preferred embodiment of the present invention is illustrated. As discussed, pivot pin 16 is received in bores through both dump body 14 and chassis 12. The pivot pins 16 preferably include a hollow passage 17 within which a payload weight sensor, preferably in the form of a strain gauge, can be mounted. The strain gauge 26 communicates information to the electronic control module via communication lines 27 in a conventional manner. Preferably, the hollow passage 17 would be sealed on its ends in order to prevent debris and/or moisture from interfering with the proper functioning of payload weight sensor 26.

INDUSTRIAL APPLICABILITY

When in operation, dump truck 10 arrives at a loading location with dump body 14 in its travel position as shown in FIG. 1. Nevertheless, those skilled in the art will also recognize that the dump truck 10 could arrive at the loading location with dump body 14 already in its payload weight measuring position. Before being loaded, the dump body is raised by dump actuator 20 to a position that allows rocker pads 32 to be rotated from the position shown in FIG. 3 to the position shown in FIG. 2 without interference with dump body 14. After positioning the rocker pads 32 in the position shown in FIG. 2 such that payload weight measuring contact surfaces 37 are exposed to contact with dump body centering pads 15, the dump body 14 is lowered onto rocker pads 32 via dumping actuator 20. In order to prevent or minimize the influence of dumping actuator 20 on the loading and weight measuring process, hydraulic pressure in the dumping actuator(s) 20 and hydraulic cylinders 40 are preferably relieved so that the dump body 14 is supported on four pins, which include two dump body pivot pins 16 and a pair of rocker pad support apparatus pins 33. If desired, or necessary, the payload weight measuring system can then be recalibrated since the weight of an empty dump body 14 should be known with relatively high precision. The dump truck 10 is then ready for loading in a conventional manner. As the truck is loaded, a payload monitoring aspect of the payload measurement system can be used to detect the payload weight increase with each shovel of material placed into dump body 14. Preferably, the loading continues until the payload weight measurement system indicates that the payload weight is within a range that reflects a preferred payload weight for efficient operation of dump truck 10.

After the desired payload weight is confirmed, the dumping actuator 20 preferably lifts the dump body 14 off of rocker pads 32 so that they may be rotated back to their travel position as shown in FIG. 3. Thus, after dump body 14 is lifted clear of rocker pads 32, the hydraulic cylinders 40 are employed to rotate rocker pads 32 from the position shown in FIG. 2 to the travel position shown in FIG. 3. Next, the dumping actuator 20 lowers dump body 14 to its travel position as shown in FIG. 1 with the bulk of the weight now supported by payload support pad rails 18 and to a lesser extent by bed support rocker apparatuses 22 and dump pivot pins 16. The truck 10 is then ready for travel to a dumping location.

The present invention provides a more accurate way to measure the weight of a payload by using strain gauged pins to support the truck body during the loading process. The strain gauged pins at each of the four support locations measure a shear load in the pin. However, in order to prevent damage to the dump body and chassis, the dump body is moved to a position that places much of its weight on the support rails 18 as shown in FIG. 1. During travel, the rocker pads act the same as current rocker pad designs in that they support a portion of the dump body load and prevent lateral motion of the dump body.

An increase in accuracy can be achieved because the load pins are generally more accurate than strut pressure sensors. In addition, the capacity of the sensors can be made closer to the payload weight being measured. Finally, strut friction and bending do not affect the payload weight measurement. These advantages allow the payload weight measurement to be generally better than plus or minus 3%, and in many instances can be better than plus or minus 1%. Preferably, the strain gauged pins are put in tight fitting, lubricated joints so that the shear load measurement accurately represents the load supported by the pin.

Those skilled in the art will appreciate that many alternatives could be made to the illustrated embodiment without departing from the intended scope of the present invention. For instance, strain gauged pins could be substituted to support the opposite ends of dumping actuator(s) 20. In that alternative, the dump body would be lifted to a payload weight measuring position such that the dump body were supported only by pivot pins 16 and pins associated with dumping actuator 20. However, in order for this alternative to work, (i.e., accurately calculate payload weight) the angular position of the dump body 14 would likely need to be known with some relatively high degree of accuracy. But this information may already be available if the truck is equipped with a conventional body position sensor. In still another embodiment of the present invention, load cells could be substituted in place of strained gauged pins, especially in the area of rocker pad support apparatuses 22. In addition, instead of rocker pads 32 being rotatable between their positions, the present invention also contemplates transitional movement to expose a payload weight measuring contact surface 37 to contact with dump body centering pads 15. Thus, in all versions of the invention, the dump body 14 is placed in a payload weight measuring position that is between its travel position and its dumping position in order to perform the payload weight measuring function. In addition, the potential detrimental effects of vibrations and other jarrings that can occur when the dump truck 10 is in motion can be substantially relieved by the present invention by relieving stress on the payload weight sensors when the dump body is in its travel position. Those skilled in the art will appreciate that the present invention allows truck 10 to be operated measurably more efficient than trucks with payload weight measuring systems of the prior art.

It should be understood that the above description is intended for illustrative purposes only, and is not intended to limit the scope of the present invention in any way. Although the present invention has been illustrated in the context of an off highway dump truck, those skilled in the art will appreciate that the principals of the present invention are also applicable to virtually any dump truck, including those that do not support the dump body on rail pads when in its travel position. Thus, those skilled in the art will appreciate that other aspects, objects, and advantages of the invention can be obtained from a study of the drawings, the disclosure and the appended claims.

What is claimed is:

1. A dump truck comprising:

a chassis;

a dump body pivotally mounted on said chassis, and being movable via a dump actuator between a travel position and a dumping position, and having a payload weight measuring position between said travel position and said dumping position; and at least one payload weight sensor operably positioned apart from the dump actuator between said chassis and said dump body when in said payload weight measuring position.

2. The dump truck of claim 1 wherein said chassis includes at least one rail support pad; and said dump body being in contact with said at least one rail support pad when in said travel position, but being out of contact with said at least one rail support pad when in said payload weight measuring position.

3. The dump truck of claim 1 including four support pins operably positioned between said chassis and said dump body.

4. A dump truck comprising:

a chassis;

a dump body pivotally mounted on said chassis, and being movable between a travel position and a dumping position, and having a payload weight measuring position between said travel position and said dumping position;

at least one payload weight sensor operably positioned between said chassis and said dump body when in said payload weight measuring position;

four support pins operably positioned between said chassis and said dump body; and a payload weight sensor at least partially positioned in each of said four support pins.

5. The dump truck of claim 3 wherein said chassis includes at least one rail support pad; and said dump body being in contact with said at least one rail support pad when in said travel position, but being out of contact with said at least one rail support pad when in said payload weight measuring position.

6. The dump truck of claim 3 wherein two of said four pins are dump body pivot pins.

7. The dump truck of claim 3 wherein two of said four pins support a pair of rocker pads.

8. The dump truck of claim 1 including a pair of rocker pads that are moveable between a first position in which said travel contact surface is exposed to contact with said dump body, and a second position in which said payload measuring contact surface is exposed to contact with said dump body.

9. The dump truck of claim 8 including a hydraulic actuator operably coupled to rotate said rocker pad between said first position and said second position.

10. A bed support apparatus for a dump truck, comprising:

a base;

a rocker pad moveably attached to said base and including a travel contact surface and a payload weight measuring contact surface;

a payload weight sensor operably positioned between said payload weight measuring contact surface and said base; and said rocker pad being moveable between a first position in which said travel contact surface is exposed to contact with a dump body, and a second position in which said payload measuring contact surface is exposed to contact with a dump body.

11. The apparatus of claim 10 including a pin interconnecting said base to said rocker pad; and said payload weight sensor being at least partially positioned in said pin.

12. The apparatus of claim 10 wherein said rocker pad rotates with respect to said base when moving between said first position and said second position.

13. The apparatus of claim 10 including a hydraulic cylinder operably coupled to said rocker pad.

14. The apparatus of claim 10 wherein said payload weight measuring contact surface is orthogonal to said travel contact surface.

15. A method of operating a dump truck, comprising the steps of:

moving a dump body of a dump truck to a payload weight measuring position that is between a travel position and a dump position;

measuring the payload weight at least in part by relieving pressure in a dump actuator; and moving the dump body to the travel position.

16. The method of claim 15 including a step of supporting the dump body on four pins when in the payload weight measuring position.

17. The method of claim 15 including a step of relieving hydraulic pressure in a rocker pad actuator when the dump body is in the payload weight measuring position.

18. A method of operating a dump truck, comprising the steps of:

moving a bed support rocker apparatus to a position that exposes a payload weight measuring contact surface to contact with a dump body;

moving said dump body of a dump truck to a payload weight measuring position that is between a travel position and a dump position;

measuring the payload weight; and moving the dump body to the travel position.

19. The method of claim 18 wherein said step of moving a bed support rocker apparatus includes a step of rotating a rocker pad.

* * * * *